July 12, 1966

D. J. GROPPE ETAL 3,260,127

MACHINE TOOL TRANSMISSION

Filed Sept. 23, 1963

INVENTORS
DONALD J. GROPPE
LEWIS A. DEVER
RICHARD C. BRASINGTON
BY
*Howard T. Keiser*
*& Jack J. Earl*
ATTORNEYS

United States Patent Office 3,260,127
Patented July 12, 1966

3,260,127
MACHINE TOOL TRANSMISSION
Donald J. Groppe, Lewis A. Dever, and Richard C. Brasington, Cincinnati, Ohio, assignors to The Cincinnati Milling Machine Co., Cincinnati, Ohio, a corporation of Ohio
Filed Sept. 23, 1963, Ser. No. 310,682
4 Claims. (Cl. 74—339)

This invention relates to a machine tool transmission and more particularly to a transmission having a mechanism by which the gears of a multispeed transmission are moved small amounts during shifting to insure proper meshing of the gears prior to rotation at full speed.

It is a standard practice during a gear shifting period in a multispeed geared transmission to rotate the gears slowly to provide a proper meshing of the gears prior to a full rotation of the gears. This reduces the clashing of gear teeth during a speed change and thus reduces noise and excessive wear of the gears. However, even this slow rotation will not completely eliminate the objectionable noise and wear although it is reduced to some extent by this practice. It is therefore an object of the invention to provide a machine tool transmission having an improved mechanism for producing the meshing of gears in a multispeed transmission without the noise and wear which result from the clashing of the teeth of rotating gears.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form this invention utilizes a mechanism by which short torque pulses are applied successively to the gear train of a multispeed transmission to produce a series of small incremental rotations of the gears during shifting to facilitate the proper meshing of the gears before before they are rotated at full speed. The mechanism includes a pulse generator which is responsive to a gear speed selector mechanism that controls the gear shifting and determines the combinations of meshed gears in the transmission. The pulse generator supplies energy pulses to a motor that is connected to the transmission and supplies the torque input to the gears. The energy pulses to the motor result in a series of incremental rotatary power pulse inputs to the transmission gear train and the series of pulses in turn causes the gears to be rotated in small steps sufficient to align all of the gear teeth for meshing without the clash which is caused by their continuous rotation during shifting. A clear understanding of the construction and operation of this invention can be obtained from the following detailed description in which reference is made to the attached drawings wherein:

Figure 1:
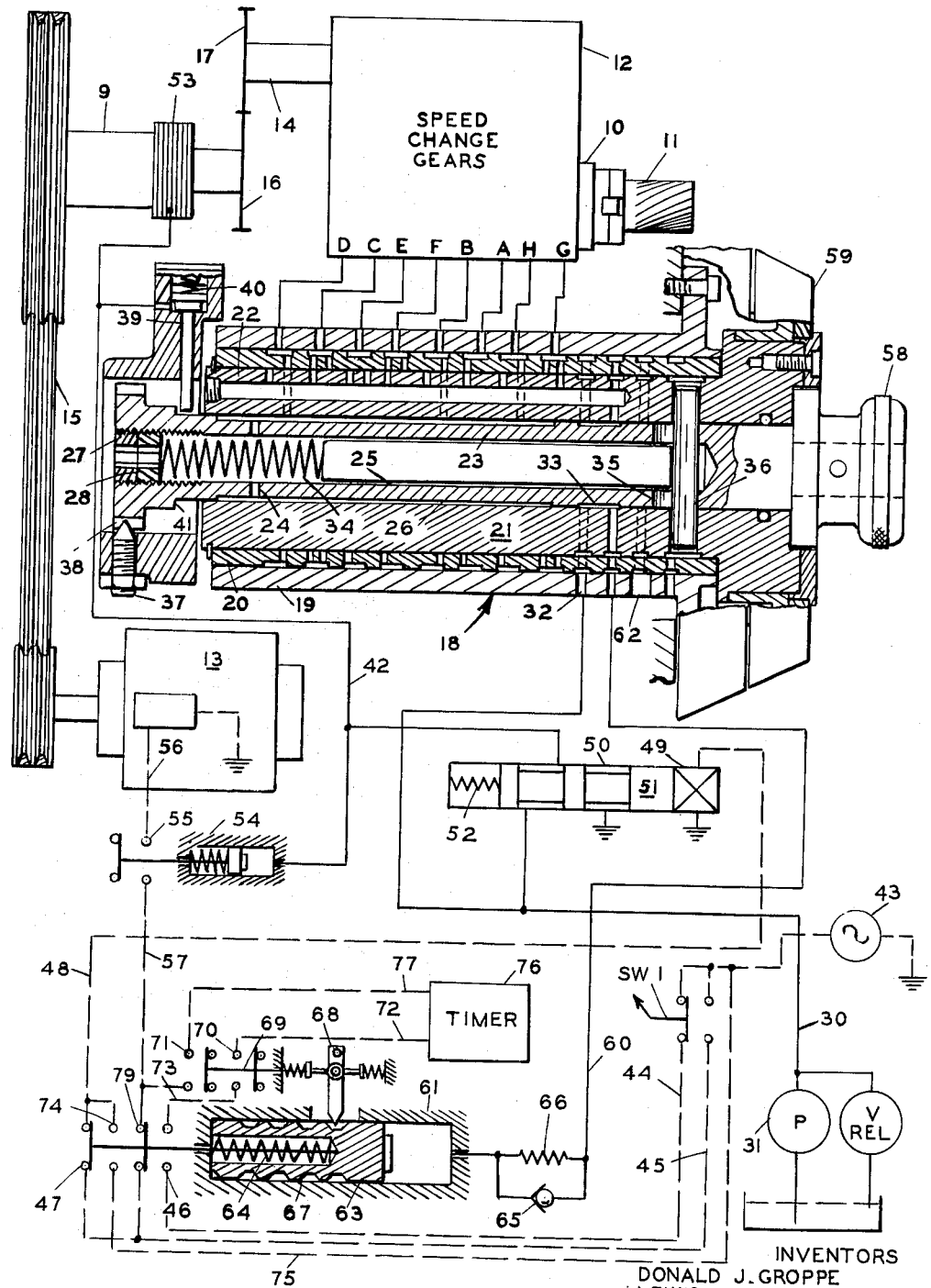
FIG. 1 is a schematic electro-hydraulic control circuit for a milling machine by which both the shifting of gears in a multispeed transmission and the rotation of those gears by a motor are effected.

The circuit of FIG. 1 shows a milling machine spindle 10 adapted to hold a cutting tool 11 and rotated by a set of speed change gears 12 that are shiftable in selected combinations to produce a plurality of predetermined speeds. The power for rotation of the gears 12 is provided by a constant speed electric motor 13 which drives a shaft 14 through belts 15, shaft 9, and gears 16, 17. The shaft 14 is the input to the speed change gears 12. The predetermined combinations of the speed change gears 12 are selected by means of a rotary selector valve 18 having fluid lines A–H connectable selectively to fluid under pressure and to exhaust pressure in accordance with the angular position of a dial 59 connected to the valve 18. The shifting of the gears to the selected combinations occurs as a result of pressure differences in piston and cylinder motors (not shown) to which the fluid lines A–H connect. The speed change gears 12 and the shifting mechanisms are of a type well known in the machine tool art and need not be described in detail herein. An example of a set of speed change gears hydraulically shifted in response to a rotary positionable selector valve is shown and described in detail in U.S. Patent 3,093,225 issued on June 11, 1963, on an application filed by Herbert R. Uhtenwoldt.

The selector valve 18 as shown in FIG. 1 is comprised of a body 19 in which a ported bushing 20 is fixed and a rotatable bushing member 21 is angularly adjustable therein to any one of a plurality of positions. In each of these positions, a selected porting of fluid under pressure from a passage 22 to some of the lines A–H occurs while other of the lines A–H are connected to the passage 23 which is at exhaust pressure by reason of its being open through a port 24 to the center hole 25 of an axially movable plunger 26 received in the rotatable bushing 21. The center hole 25 is exhausted to atmospheric pressure through the adjusting screws 27, 28 threaded into the end of the plunger 26. The passage 22 is supplied with fluid under pressure from a main pressure supply line 30 connected to a pump 31 since the line 30 connects at the port 32 which communicates through the bushing 21 to a cannelure 33 on the plunger 26 that is ported to the passage 22. The plunger 26 is normally biased by a spring 34 to the position shown so that the passage 22 is connected to the pressure line 30 to hold the gears 12 in combinations that produce the selected speed of the spindle 10 corresponding to the angular position of the bushing 21. The plunger 26 is axially movable a limited amount in the bushing 21 against the force of the spring 34 due to an axially elongated clearance hole 35 in the plunger 26 through which a roll pin 36 passes, the roll pin being fixed in the rotatable bushing 21 to render the plunger 26 and bushing 21 rotatable in unison. When the plunger 26 is in the axial position shown, it and the bushing 21 are prevented from rotating by a fixed detent pin 37 which extends into the space between adjacent teeth of a gear 38 that is fixed on the rear of the plunger 26. The gear 38 has a sufficient number of teeth to provide detenting notches for the pin 37 corresponding with the predetermined angular positions to which the bushing 21 is rotatable. A stop member 39 also is extended by a spring 40 to engage a shoulder 41 on the plunger 26 to prevent its axial movement from the position shown. The stop 39 is retractable against the force of the spring 40 by the connection of fluid pressure to a line 42 in communication with the stop 39 on the side opposite the spring.

A spindle speed change resulting in a shift of the gears 12 is initiated by a manual shift of the plunger 26 and a rotation of the bushing 21 to a new position. This can be accomplished only when the spindle 10 is not powered for rotation and this condition prevails when a selector switch SW1 is in the condition shown corresponding to the spindle stop position. With the switch SW1 in its stop position, a source of electric power 43 is connected to a conductor 44 and disconnected from another conductor 45. (Electrical conductors are shown in FIG. 1 as broken lines to distinguish them from hydraulic conduits which are shown as solid lines.) The conductors 44 and 45 are connected to one side of each of a pair of switch contacts 46, 47, respectively, the operation of which will be described subsequently herein. In addition a conductor 75 extends directly from the source 43 to a set of contacts 74 in parallel with the contacts 47. The contacts 47 are closed at this time and the other contacts 74 are open. Therefore, only the deenergized line 45 is connected to a conductor 48 which connects with the solenoid 49 of a valve 50 that has a plunger 51 normally biased by a spring 52 to the position shown. Therefore, the main pressure line 30 from the pump 31 is in communication with the fluid line 42 which, as described, removes the stop 39 from the shoulder 41 to permit the plunger 26 to be moved rightward. The fluid line 42 also applies pressure at this time to a fluid actuated brake 53 received on the shaft 9 to prevent a rotational input to the gears 12. A pressure switch 54 is also operated to open its contacts 55 in series connection between power lines 56, 57 which are in the energizing circuit for spindle motor 13. Thus the motor 13 is not operated at the time the brake 53 is applied.

With the circuit as described, a spindle speed change may be made by manually pulling a knob 58 of the plunger 26 outward and then rotating it until a dial 59 on the bushing 21 indicates the desired speed. The outward shift of the plunger 26 disconnects pressure from the passage 22 and also disconnects pressure from a fluid line 60 extending from the selector valve 18 to a pulse generator valve 61, shown schematically in FIG. 1 and to be described in detail subsequently herein. Both the passage 22 and the line 60 are connected to a drain port 62. The valve 61 has a plunger 63 which is biased by a spring 64 to shift rightward as shown in FIG. 1 when the line 60 is at exhaust pressure. A free path of movement of the fluid in the valve 61 out from in front of the plunger 63 as it is shifted by the spring 64 is provided through a ball check 65 so that the plunger 63 moves quickly to the right as viewed in FIG. 1. Movement of the plunger 63 to the right operates to open the contacts 47 and to close the other contacts 74. Therefore, the solenoid 49 is energized and the plunger 51 in the valve 50 is shifted against its spring 52 and pressure is disconnected from the fluid line 42 to release the brake 53 and to close the contacts 55 in the energizing circuit of the motor 13.

The motor 13 is not immediately energized however. At this same time, the stop 39 is reapplied by the spring 40 but the shoulder 41 has been moved beyond the stop 39 so that the position of the plunger 26 is unaffected.

When the selector dial 59 indicates the desired speed, the knob 58 is released and the plunger 26 is immediately shifted to the left to reconnect pressure to the passage 22 and to the fluid line 60. The gear shifters in the speed selection gear box 12 operate to produce predetermined gear combinations to provide the selected speed as in the previously cited Patent 3,093,225. The pressure in the fluid line 60 does not result in an immediate shift of the plunger 63 to the position shown in the valve 61 due to a dynamic restriction 66 in the line 60 which allows the plunger 63 to move only at a predetermined rate. As indicated the plunger 63 has a series of raised collars 67 thereon and these collars 67 move back in succession past a toggle 68 that operates a limit switch 69 to intermittently close two sets of contacts 70, 71. The contacts 70, when closed, connect a conductor 72 to another conductor 73 that extends from the set of contacts 46. The contacts 46 are closed when the plunger 63 is not in the position shown. The conductor 44 connects the power source 43 through the switch SW1 to the other side of the contacts 46 and when they are closed along with the contacts 70 a power pulse is connected to a timer mechanism 76 which operates to complete a circuit from the line 72 to a line 77. The timer mechanism 76 operates to shorten the pulses of electrical energy applied to the motor 13 to a time duration less than the time that power is connected through the contacts 70. It may be any well known type of electrical or pneumatic timer with an adjustable timing cycle to complete a circuit for a preset time only upon the application of each of the pulses from the contacts 70. The line 77 is connected by means of the contacts 71 to the power line 57 to momentarily energize the motor 13. When the second and succeeding collars 67 are moved into contact with the toggle 68, similar short energizing pulses are applied to the motor 13. These pulses are of such duration that very little rotation of the gears 12 is accomplished since the resulting torque pulse from the motor is not long enough to appreciably accelerate the gears 12. In this way the gears 12 are incrementally rotated small amounts to insure that the teeth of each of the gears is in mesh with another gear before continuous rotation of the gears 12 is attempted.

When the plunger 63 has returned to the position shown, the control circuit is restored to its original state with the contacts 47 closed and the contacts 74 open to deenergize the solenoid 49, thus allowing the plunger 51 to return to the position shown. The brake 53 is reset to prevent further rotation of the gears 12 until spindle operation is required or until another spindle speed change is made. The spindle 10 is caused to be rotated by operation of the selector switch SW1 to connect the source of power 43 to the power line 45 which also extends to a set of contacts 79, now closed while the plunger 63 is in the position shown. The line 45 is then connected directly to the line 57. At this same time, the conductor 44 is disconnected from both the source 43 and the conductor 45. The contacts 47, being closed while the plunger 63 is in the condition shown therefore connect the conductors 45 and 48 together and thus the solenoid 49 is again energized to remove pressure from the line 42 to release the brake 53 and to allow the contacts 55 to connect conductors 56 and 57 together to complete the motor energizing circuit.

Figure 2:
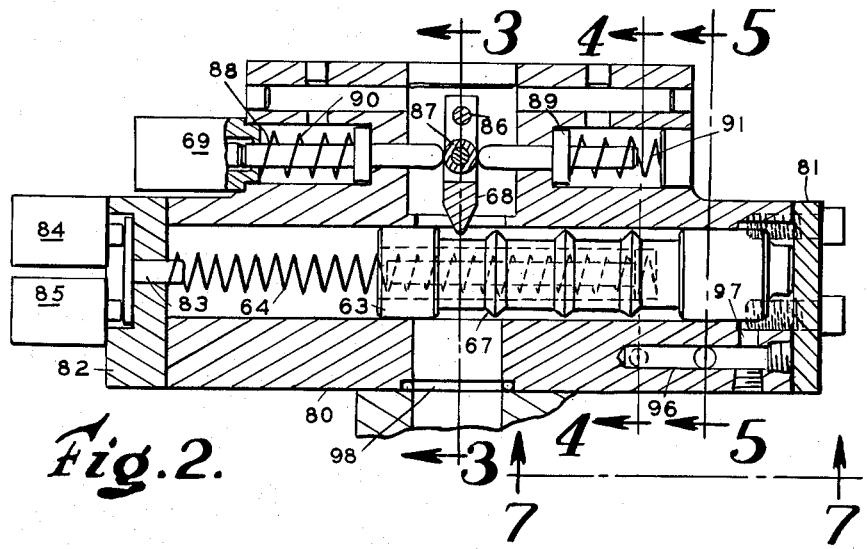
FIGS. 2 through 7 are detailed views of a control valve used in the circuit of FIG. 1 to produce pulsed operation of the motor therein.
Figures 3, 4, 5:
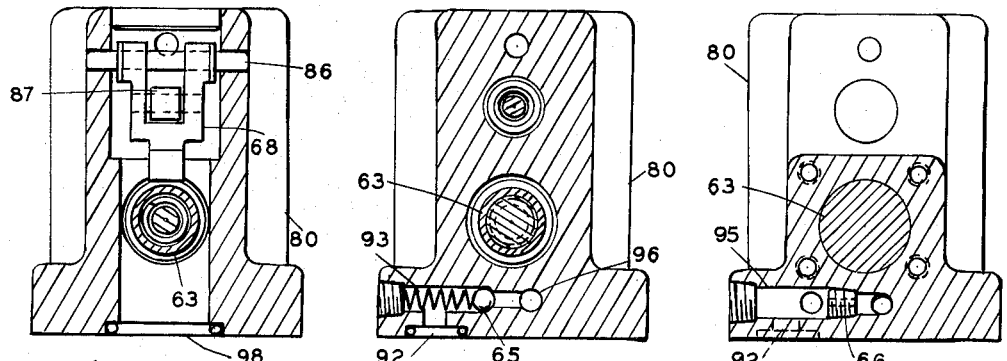
Figures 6, 7:
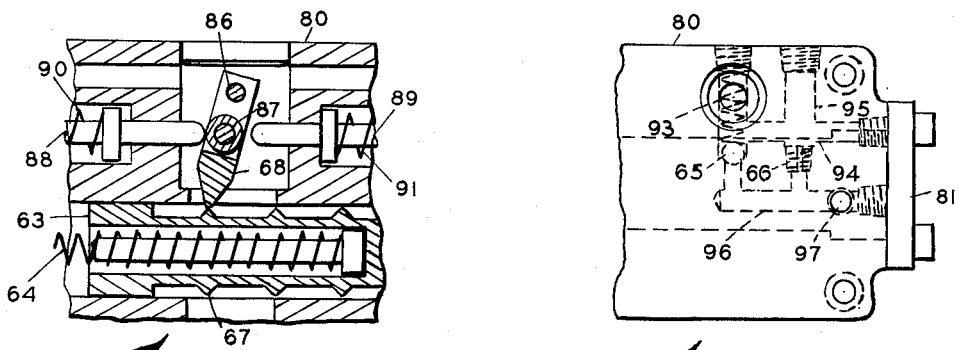

The pulse generator valve 61 is shown in detail in FIGS. 2 through 7. It is comprised of a body 80 in which the plunger 63 is slidably received and constantly urged to the right, FIG. 2, by the spring 64. One end of the body 80 is closed by a cap 81 while the other end is closed by another cap 82 having a T-shaped member 83 slidably received therethrough for engagement by the plunger 63 when that plunger is at its extreme leftward position. The member 83 is engaged by two limit switches 84, 85 which respectively include the contacts 47, 74 and 46, 79 and these contacts are caused to be operated in the described manner through a shift of the member 83 corresponding to positioning of the plunger 63 in contact with or away from the member 83. As shown in FIGS. 2, 3 and 6, the toggle 68 is Y-shaped and pivotally received in the housing 80 to be swingable on a pin 86. A roller 87 is held in the toggle 68 and is adapted to engage two plungers 88, 89 biased into contact on opposite sides thereof by springs 90, 91. The toggle 68 then tends to move to a center position with its lower end extending into the body 80 where it will be contacted by the collars 67 while the plunger 63 is shifted. The limit switch 69 is mounted at a location in line with the plunger 88 and is operated thereby when the toggle 68 is swung clockwise to the position shown in FIG. 6 and thus the contacts 70, 71 are closed. There is no limit switch operated by the other plunger 89 and therefore the valve 61 will produce pulses only when the plunger 63 is shifted toward the left as viewed in FIG. 2.

The fluid line connections to the valve 61 are shown in FIGS. 2, 4, 5, and 7. The line 60 from the speed selector valve 18 connects to the port 92 and from there it connects through the interdrilled passages 93, 94 and 95 to both the dynamic restriction 66 and to the ball check 65 in parallel connection between the passage 94 and a passage 96 that connects through a port 97 to the right end, FIG. 2, of the plunger 63 in the body 80. As can be seen, the ball check prevents high pressure fluid in the line 60 connected at the port 92 from entering the body 80 without passing through the restriction 66 but will allow the fluid to escape from the body 80 when the line 60 is at exhaust pressure. The valve 61 also includes an exhaust port 98, FIG. 2, which drains any fluid from the body 80 around the area of the plunger 63 where the collars 67 are located.

While the invention has been described in connection with one possible form or embodiment thereof, it is to be understood that the present disclosure is illustrative rather than restrictive and that changes and modifications may be resorted to without departing from the spirit of the invention or the scope of the claims which follow.

What is claimed is:

1. In a machine tool having a motor, a spindle and a set of speed change gears shiftable in selected combinations to connect the spindle to the motor for rotation at preselected rates, a mechanism for synchronizing the meshing of the gears upon shifting comprising in combination:
   (a) a pulse generator valve including a plunger shiftable therein and means responsive to the shifting of said plunger to produce a series of energy pulses,
   (b) selector means to control the shifting of the set of gears into predetermined combinations,
   (c) means responsive to the operation of said selector means to initiate the shifting of said plunger, and
   (d) means to connect said energy pulses to the motor for intermittent operation thereof to apply torque pulsations to the set of gears.

2. The mechanism of claim 1 wherein:
   (a) the motor is an electric motor,
   (b) said plunger is fluid actuated, and
   (c) said means responsive to the shifting of said plunger is an electrical device pulsatingly operated when said plunger is shifted in said valve to produce corresponding electrical pulses.

3. The mechanism of claim 2 wherein there is included in said means to connect pulses to the motor a timing mechanism responsive to said electrical pulses to limit the duration of application of each of said pulses to the motor to a preselected time.

4. The mechanism of claim 2 wherein:
   (a) there is a source of electric power,
   (b) said plunger is reciprocally moved away from and back to one end of said valve when actuated,
   (c) means disconnect said source of electric power from said electrical device when said plunger is at said one end of the valve, and
   (d) means connect said source of eelctric power to said electrical device when said plunger is shifted away from said one end of the valve to produce said electrical pulses.

References Cited by the Examiner
UNITED STATES PATENTS 2,928,290  3/1960  Hosea et al. _____ 74—339

DAVID J. WILLIAMOWSKY, *Primary Examiner.*

H. S. LAYTON, *Assistant Examiner.*